No. 712,606. Patented Nov. 4, 1902.
F. H. SHAW.
ATTACHMENT FOR WATERING CANS.
(Application filed July 22, 1902.)

(No Model.)

Witnesses

Inventor
F. H. Shaw
By 
Attorneys

THE NORRIS PETERS CO., PHOTO-LITHO., WASHINGTON, D. C.

UNITED STATES PATENT OFFICE.

FREDERICK H. SHAW, OF CHESTER, PENNSYLVANIA.

ATTACHMENT FOR WATERING-CANS.

SPECIFICATION forming part of Letters Patent No. 712,606, dated November 4, 1902.

Application filed July 22, 1902. Serial No. 116,588. (No model.)

*To all whom it may concern:*

Be it known that I, FREDERICK H. SHAW, a citizen of the United States, residing at Chester, in the county of Delaware, State of Pennsylvania, have invented certain new and useful Improvements in Attachments for Watering-Cans; and I do hereby declare the following to be a full, clear, and exact description of the invention, such as will enable others skilled in the art to which it appertains to make and use the same.

This invention relates to attachments for watering-cans, and more particularly to sprinklers therefor, the object of the invention being to provide a construction which may be manipulated to permit the water to be poured from the can in a wide sheet or to be sprayed.

A further object of the invention is to provide a construction wherein the water will not drip from the sprinkler after the watering operation, other objects and advantages of the invention being understood from the following description.

Figure 1:
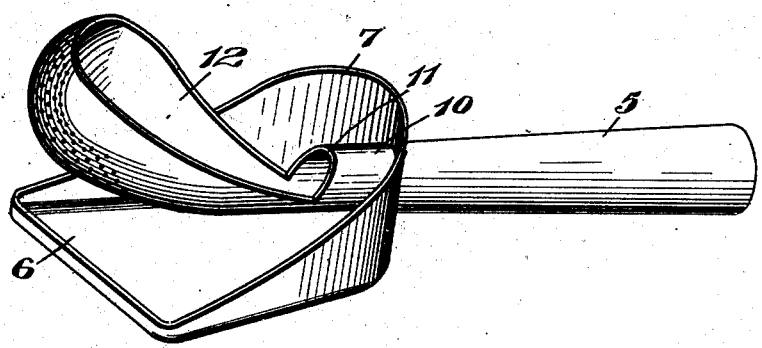
Figure 2:
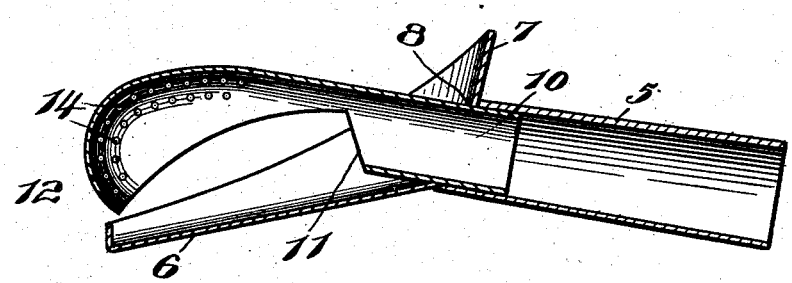
Figure 2:
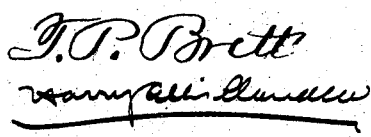
Figure 2:
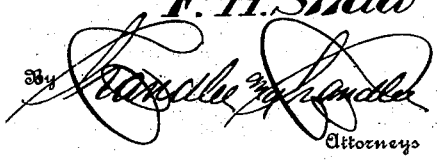

In the drawings forming a portion of this specification, and in which like numerals of reference indicate similar parts in both views, Figure 1 is a perspective view of the attachment with the sprayer in active position. Fig. 2 is a longitudinal section through the attachment and showing the sprayer turned to inactive position.

Referring now to the drawings, the present device comprises two members, of which one includes the tapered stem 5 of tubular form, which is adapted to be fitted upon the spout of a watering can or pot after the manner of fitting the usual rose-sprinkler, and at the outer or minor end of the stem is secured what may be called the "pan" 6. The pan 6 consists of a flat bottom portion having the raised circumscribing edge 7, the bottom being straight at one end and curved at its sides and opposite end, so that it is, in effect, semi-elliptical. The raised edge or wall is of constant height along the straight side or end of the bottom, and at the ends of this constant portion the height of the raised edge or wall gradually increases at the middle of the opposite end of the bottom. Through the portion of the raised edge or wall of greatest height is formed the opening 8, with which communicates the tubular stem 5, which latter is soldered or otherwise securely attached. With this simple member engaged with the spout of the watering-can the water when poured will run onto the flat bottom of the pan and will be discharged over the straight edge of the pan in the form of a sheet, thus permitting of emptying the can quickly without pouring the water so as to disturb the earth around the roots of plants. The second member consists also of a stem, to which is attached a pan. The stem in the second instance is formed tubular, as shown at 10, and is of such size as to permit of being fitted snugly into the stem 5, while permitting rotation therein. To the end of the stem 10, which is cut bias, as shown at 11, is secured a dished pan 12, so positioned that the water discharged from the stem 10 will enter it, said pan being attached at the extreme end of the stem, as shown. The stem 10 is fitted into the stem 5, and when the pan 12 is to be used it is rotated to the position shown in Fig. 1, and because of the shape of the pan the water entering it will run beyond the outer end of the pan 6 and will splash over the edge of the pan 12 in the form of a spray through the perforations 14 in the bottom of the pan 12. When the sprayer is not to be used, it is rotated to the position shown in Fig. 2, when the water from the stem 5 will run into pan 6 after passing through stem 10 and will be finally discharged from pan 6, as above described.

It will be understood that when desired the stem 10 may be removed from stem 5, and when this is done the water that may remain in pan 6 after the use of the can will run back through stem 5 into the pot instead of dripping.

It will be understood that in practice modifications of the specific construction shown may be made and that any suitable materials and proportions may be used for the various parts without departing from the spirit of the invention.

What is claimed is—

1. An attachment for watering-cans comprising a tubular stem for attachment to the spout of the can and having a pan at one end, and a second pan provided with a tubular stem rotatably engaged in the first-named stem for movement of the second pan into the path of discharge from its stem, the first pan being arranged to lie in the path of discharge of the second stem when the second pan is out of the line of discharge of said stem.

2. An attachment for watering-cans comprising a tubular stem for attachment to the spout of the can and having a pan at one end having a raised edge, and a second dished pan provided with a tubular stem rotatably engaged in the first-named stem, the second pan being connected at one side only to its stem.

In testimony whereof I affix my signature in presence of two witnesses.

FREDERICK H. SHAW.

Witnesses:
JAMES MANGHAM,
J. A. WOOD.